US005596084A

United States Patent [19]

Sanderson et al.

[11] Patent Number: 5,596,084
[45] Date of Patent: Jan. 21, 1997

[54] ALGINATE GELS

[75] Inventors: George R. Sanderson, Carlsbad; Dave Ortega, San Diego; Tom Sifferman, El Cajon, all of Calif.

[73] Assignee: Monsanto Company, St. Louis, Mo.

[21] Appl. No.: 318,307

[22] Filed: Oct. 5, 1994

[51] Int. Cl.⁶ .................................................. C08B 37/04
[52] U.S. Cl. ................................. 536/3; 536/126; 210/263
[58] Field of Search .................... 536/3, 126; 210/263

[56] References Cited

U.S. PATENT DOCUMENTS

| | | | |
|---|---|---|---|
| 2,400,834 | 5/1946 | Le Gloahec | 536/3 |
| 2,808,337 | 10/1957 | Gibsen | 536/3 |
| 4,401,456 | 8/1983 | Connick, Jr. | 71/88 |
| 4,927,761 | 5/1990 | Reading et al. | 435/178 |
| 5,009,710 | 4/1991 | Bewsey | 536/3 |
| 5,144,016 | 9/1992 | Skjak-Braek et al. | 536/3 |
| 5,302,399 | 4/1994 | Otagiri et al. | 424/493 |
| 5,482,932 | 1/1996 | Thompson | 536/3 |

*Primary Examiner*—Nathan M. Nutter
*Attorney, Agent, or Firm*—Jeffrey M. Hoster

[57] ABSTRACT

The invention is a gel comprising water, sodium ions, calcium ions, and about 0.3 and 4% alginate, wherein the ratio of sodium ions to calcium ions is between about 15:1 to about 45:1. In a preferred embodiment of the invention, the alginate comprises mannuronic acid and guluronic acid in a weight ratio of between about 2:1 and 0.35:1.

4 Claims, No Drawings

ALGINATE GELS

BACKGROUND OF THE INVENTION

Alginate has been used for many years as a gelling agent in puddings, fruit fillings, dessert gels, and structured foods, as a water binder in frozen foods, pastry fillings syrups, and icings, as an emulsifier in salad dressings and meat flavor sauces, and as a stabilizer in beer, fruit juice, toppings, sauces and gravies.

It is well known that alginates react with polyvalent cations, including zinc, aluminum, copper and calcium, to form gels or precipitates. It is also well known that the viscosity of sodium alginate solutions is altered by the addition of monovalent salts but that such salts do not induce gelation.

We have surprisingly found that alginate solutions do, in fact, form diffusion-set gels upon addition to certain kinds of water, such as seawater, having high concentrations of sodium ions.

SUMMARY OF THE INVENTION

The invention is a gel comprising water, sodium ions, calcium ions, and about 0.3 and 4% alginate, wherein the ratio of sodium ions to calcium ions is between about 15:1 to about 45:1. In a preferred embodiment of the invention, the alginate comprises mannuronic acid and guluronic acid in a weight ratio of between about 2:1 and 0.35:1.

The gels of the present invention are formed from alginate solutions added to water having high concentrations of sodium ions. The solutions form diffusion-set gels.

DETAILED DESCRIPTION OF THE INVENTION

The invention is a gel comprising water, sodium ions, calcium ions, and alginate, wherein the ratio of sodium ions to calcium ions is between about 15:1 to about 45:1, and the amount of alginate is between about 0.3 and 4%, preferably about 0.7 and 2%. In a preferred embodiment of the invention, the alginate comprises mannuronic acid and guluronic acid in a weight ratio of between about 2:1 and 0.35:1.

The invention is a gel comprising water, sodium ions, calcium ions, a sequestrant, and alginate, wherein the ratio of sodium ions to calcium ions is between about 15:1 to about 45:1, the amount of sequestrant is between about 0.01 and 1.5%, preferably 0.05 and 0.6%, and the amount of alginate is between about 0.3 and 4%, preferably about 0.7 and 2%. In a preferred embodiment of the invention, the alginate comprises mannuronic acid and guluronic acid in a weight ratio of between about 2:1 and 0.35:1.

The invention is also a gel comprising water, sodium ions, calcium ions, sequestrant, gellan gum, and alginate, wherein the ratio of sodium ions to calcium ions is between about 15:1 to about 45:1, the amount of gellan gum is between about 0.05 and 4%, preferably 0.2 and 1%, the amount of sequestrant is between about 0.01 and 1.5%, preferably 0.05 and 0.6%, and the amount of alginate is between about 0.3 and 4%, preferably about 0.7 and 2%. In a preferred embodiment, the alginate comprises mannuronic acid and guluronic acid in a weight ratio of between about 2:1 and 0.35:1.

The invention is a gel comprising water, sodium ions, calcium ions, a sequestrant and gellan gum, wherein the ratio of sodium ions to calcium ions is between about 15:1 to about 45:1, the amount of gellan gum is between about 0.05 and 4%, preferably 0.2 and 1%, and the amount of sequestrant is between about 0.01 and 1.5%, preferably 0.05 and 0.6%.

The invention is also a process for preparing a gel comprising water, sodium ions, calcium ions, and between about 0.3 and 4% alginate, wherein the ratio of sodium ions to calcium ions is between about 15:1 to about 45:1, comprising:

a) forming a solution of between about 0.3 and 4% sodium alginate;

b) pouring the solution of a) into water having a ratio of sodium ions to calcium ions between about 15:1 to about 45:1; and c) allowing the gel to set.

The invention is also a process for preparing a gel comprising water, sodium ions, calcium ions, between about 0.01 and 1.5% sequestrant, and between about 0.3 and 4% alginate, wherein the ratio of sodium ions to calcium ions is between about 15:1 to about 45:1, comprising:

a) forming a solution of between about 0.01 and 1.5% sequestrant and between about 0.3 and 4% sodium alginate;

b) pouring the solution of a) into water having a ratio of sodium ions to calcium ions between about 15:1 to about 45:1; and c) allowing the gel to set.

The invention is also a process for preparing a gel comprising water, sodium ions, calcium ions, between about 0.05 and 4% gellan gum, between about 0.01 and 1.5% sequestrant, and between about 0.3 and 4% alginate, wherein the ratio of sodium ions to calcium ions is between about 15:1 to about 45:1, comprising:

a) forming a solution of between about 0.3 and 4% sodium alginate, between about 0.01 and 1.5% sequestrant and between about 0.05 and 4% gellan gum;

b) pouring the solution of a) into water having a ratio of sodium ions to calcium ions between about 15:1 to about 45:1; and c) allowing the gel to set.

The invention is also a process for preparing a gel comprising water, sodium ions, calcium ions, between about 0.01 and 1.5% sequestrant and between about 0.05 and 4% gellan gum, wherein the ratio of sodium ions to calcium ions is between about 15:1 to about 45:1, comprising:

a) forming a solution of between about 0.01 and 1.5% sequestrant and between about 0.05 and 4% gellan gum;

b) pouring the solution of a) into water having a ratio of sodium ions to calcium ions between about 15:1 to about 45:1; and c) allowing the gel to set.

The present invention provides a method for blocking oil-producing formation water flow to an oil-producing formation which comprises introducing into the formation a gel comprising water, sodium ions, calcium ions, and about 0.3 and 4% alginate, wherein the ratio of sodium ions to calcium ions is between about 15:1 to about 45:1.

The present invention also provides a method for removing formation debris in an oil pipeline which comprises introducing to the pipeline a gel comprising water, sodium ions, calcium ions, and about 0.3 and 4% alginate, wherein the ratio of sodium ions to calcium ions is between about 15:1 to about 45:1.

The present invention also provides a method for insulating high temperature oil within a pipe located in a low temperature environment comprising substantially enveloping the pipe with a gel comprising water, sodium ions, calcium ions, and about 0.3 and 4% alginate, wherein the ratio of sodium ions to calcium ions is between about 15:1 to about 45:1.

The present invention also provides a method for solidifying a waste pit formed during oil drilling and production operations comprising adding to the pit a gel comprising water, sodium ions, calcium ions, and about 0.3 and 4% alginate, wherein the ratio of sodium ions to calcium ions is between about 15:1 to about 45:1.

The present invention also provides a method for reducing chemical leaching from waste pits which comprises lining the waste pit with a gel comprising water, sodium ions, calcium ions, and about 0.3 and 4% alginate, wherein the ratio of sodium ions to calcium ions is between about 15:1 to about 45:1.

The present invention also provides a method for reducing fluid loss into a formation, from a fluid, such as a drilling mud, which comprises forming a film, comprising a gel comprising water, sodium ions, calcium ions, and about 0.3 and 4% alginate, wherein the ratio of sodium ions to calcium ions is between about 15:1 to about 45:1, around the fluid-containing matrix.

The present invention also provides a method for inhibiting moisture depletion from poured cement comprising coveting the poured cement with a gel comprising water, sodium ions, calcium ions, and about 0.3 and 4% alginate, wherein the ratio of sodium ions to calcium ions is between about 15:1 to about 45:1.

The present invention provides a method for blocking oil-producing formation water flow in an oil-producing formation which comprises introducing into the formation a solution of about 0.3 and 4% alginate, which solution forms a gel following introduction to the formation and contact with water containing sodium and calcium ions, wherein the ratio of sodium ions to calcium ions is between about 15:1 to about 45:1.

The present invention also provides a method for removing formation debris in an oil pipeline which comprises introducing to the pipeline a solution of about 0.3 and 4% alginate, which solution forms a gel following introduction to the pipeline and contact with water containing sodium and calcium ions, wherein the ratio of sodium ions to calcium ions is between about 15:1 to about 45:1.

The present invention also provides a method for insulating high temperature oil within a pipe located in a low temperature environment comprising substantially enveloping the pipe with a solution of about 0.3 and 4% alginate, which solution forms a gel following envelopment of the pipe and contact with water containing sodium and calcium ions, wherein the ratio of sodium ions to calcium ions is between about 15:1 to about 45:1.

The present invention also provides a method for solidifying a waste pit formed during oil drilling and production operations comprising adding to the pit a solution of about 0.3 and 4% alginate, which solution forms a gel following addition to the pit and contact with water containing sodium and calcium ions, wherein the ratio of sodium ions to calcium ions is between about 15:1 to about 45:1.

The present invention also provides a method for reducing chemical leaching from waste pits which comprises lining the waste pit with a solution of about 0.3 and 4% alginate, which solution forms a gel following lining of the waste pit and contact with water containing sodium and calcium ions, wherein the ratio of sodium ions to calcium ions is between about 15:1 to about 45:1.

The present invention also provides a method for reducing fluid loss into a formation, from a fluid, such as a drilling mud, which comprises forming a film with a solution of about 0.3 and 4% alginate, around the fluid-containing matrix, by contacting the matrix with the solution and contacting the solution with water containing sodium and calcium ions, wherein the ratio of sodium ions to calcium ions is between about 15:1 to about 45:1.

The present invention also provides a method for inhibiting moisture depletion from poured cement comprising coveting the poured cement with a solution of about 0.3 and 4% alginate, which solution forms a gel following coverage of the poured cement and contact with water containing sodium and calcium ions, wherein the ratio of sodium ions to calcium ions is between about 15:1 to about 45:1.

For all of the methods described above where the solution is applied prior to gelation, such gelation occurs when the solution resides in a substantially static, non-flowing state.

The methods described above may also be practiced using gels comprising both alginate and gellan gum, or with gels comprising gellan gum as the sole gelling agent.

Water having a ratio of sodium ions to calcium ions between about 15:1 to about 45:1 is typically available from natural salt water sources such as seawater. For purposes of the present invention, seawater or water having a sodium::calcium ion ratio of between about 15:1 to about 45:1 is suitable.

Gellan gum is a heteropolysaccharide prepared by fermentation of *Pseudomonas elodea* ATCC 31461. Gellan gum is available from Kelco Division of Merck & Co., Inc., San Diego, Calif., under various names, including KELCOGEL, KELCOGEL PC, and KELCOGEL F. Processes for preparing gellan gum include those described in U.S. Pat. Nos. 4,326;052 and 4,326,053. It is useful for a variety of gelling, texturizing, stabilizing and film forming applications, particularly as a gelling agent in foods, personal care products and industrial applications.

Gellan gum is a gelling and texturizing agent that forms gels in the presence of ions. Unlike other gelling agents, gellan gum is capable of forming gels with all ions presented to it, including hydrogen ions. Gels can be conveniently prepared by allowing hot solutions containing ions to cool. A less common, but sometimes useful method is to prepare gels by allowing ions to diffuse into the solution. This method is employed, for example, in the formation of films and coatings, e.g. batters and related edible coatings. Of particular value in these coatings is gellan's ability to form gels with sodium ions. Thus, sodium chloride can be used as the source of gelling ions and the resulting food maintains an acceptable taste, sometimes not the case with other ions such as calcium which can impart a bitter taste.

As a result of these properties, gellan gum solutions, when added to high sodium ion containing seawater, form gels upon diffusion into the solutions of the various ions present in seawater. This property can be used advantageously in a variety of applications including, but not limited to, the applications described above.

Commercial forms of gellan gum, an anionic polymer, are produced as mixed salts. Although the gum is predominantly in the potassium salt form, there are usually sufficient divalent ions present, e.g. calcium and magnesium, to render the product insoluble in cold water. Solubility is further impaired if the water into which the gum is to be dissolved or hydrated also contains ions. This is to be expected since, if ions are able to promote interchain association (gelation), they will also prevent interchain dissociation (dissolution).

Solubility of gellan gum in cold water can usually be achieved simply by removal of the divalent ions in the water by the use of a sequestrant. Divalent ions are much more efficient at making gels than monovalent ions and so removal of the former with sequestrant usually results in an aqueous medium in which the gum is soluble. The sequestrant not only removes the divalent ions from the water but also the divalent ions from the gellan gum, converting it to the cold water soluble monovalent ion form. Typical sequestrants that can be employed include a variety of inorganic phosphates such as sodium hexametaphosphate, tetrasodium pyro-phosphate, disodium orthophosphate, and sodium tripolyphosphate. Sodium citrate can also be used.

The presence of three kinds of polymer segments in alginic acid from various brown seaweeds has been shown by mild acid hydrolysis. One segment consists essentially of D-mannuronic acid units. A second segment consists essentially of L-guluronic acid units. The third segment consists of alternating D-mannuronic acid and L-guluronic acid residues.

The proportions of the three polymer segments in alginic acid samples from different sources have been determined using partial acid hydrolysis to separate the alginic acid into homopolymeric and alternating segments. The proportion of polymannuronic acid and polyguluronic acid segments has been determined by p.m.r. spectroscopy. Table 1 shows the proportions of mannuronic acid and guluronic acid in alginic acid samples derived from various brown seaweeds.

TABLE 1

Mannuronic Acid and Guluronic Acid Composition of Alginic Acid Obtained from Commercial Brown Seaweeds

| Species | Mannuronic Acid Content (%) | Guluronic Acid Content (%) |
|---|---|---|
| Macrocystis pyrifera | 61 | 39 |
| Ascophyllum nodosum | 65 | 35 |
| Laminaria digitata | 59 | 41 |
| Laminaria hyperborea (stipes) | 31 | 69 |
| Ecklonia cava and Eisenia bicyclis | 62 | 38 |

Polyguluronic acid is a buckled, ribbon-like molecule in which the guluronic acid is in the 1C conformation and di-axially linked. The buckled, ribbon-like conformation is stabilized by an intramolecular hydrogen bond between the hydroxyl group on carbon 2 and the oxygen atom of the carboxyl group in adjacent units. The interchain bonds are more complicated than in the case of polymannuronic acid and involve water molecules. A water molecule is in such a position that it functions twice as a hydrogen bond donor and twice as an acceptor, the hydrogen bonds so formed being in the range of 2.7A–2.9A. In accord with density measurements and for symmetry preservation, four molecules of water are required in the unit cell.

One of the most important and useful properties of alginates is its ability to form gels by reaction with calcium salts. These gels, which resemble a solid in retaining their shape and resisting stress, consist of almost 100% water (normally, 99.0 to 99.5% water and 0.5 to 1.0% alginate).

A gel, in classical colloid terminology, is defined as a system which owes its characteristic properties to a cross-linked network of polymer chains which form at the gel point. A considerable amount of research has been carded out to elucidate the nature of the cross-links and determine the structure of alginate gels.

It has been shown on the basis of fiber diffraction data, model-building calculations and other studies that the shape of both the polymannuronic acid segments and the polyguluronic acid segments of alginic acid is ribbon-like and extended. On the basis of these data and the properties of gels, it has been suggested that cooperative association of the polyguluronic acid segments is involved in the formation of the cross-linked network of polymer chains. The current proposed structure of an alginate gel in which calcium ions are bound between the associated segments of the polymer chains is often referred to as an "egg-box model".

Circular dichroism studies have shown that the calcium ions react preferentially with the polyguluronic acid segments. It is possible that the alternating and polymannuronic segments play no direct role in the gelation with calcium except to join the associated segments and hence provide a three-dimensional network of chains within the gel.

The nature of the interaction between the polyguluronate segments and calcium ions has been further refined using both the known coordination geometries of model compounds and the requirements for cooperative association. In this interaction the polyguluronate segments associate into aggregates with interstices into which the calcium ions fit, the egg-box model.

This information can be used to predict the observed gelling characteristics of alginates from different sources. For example, the alginate from Laminaria hyperborea, with a large percentage of polyguluronate segments, forms rigid, brittle gels which tend to undergo syneresis, or loss of bound water. In contrast, alginate from Macrocystis pyrifera or Ascophyllum nodosum forms elastic gels which can be deformed and which have a markedly reduced tendency toward syneresis.

Suitable alginates for the present invention include but are not limited to sodium alginates, potassium alginates and ammonium alginates. A variety of alginates are commercially available from Kelco, a Division of Merck & Co., Inc. (San Diego, Calif.). These alginates vary according to algal source, mannuronic acid and guluronic acid content, molecular weight, particle form and mesh size. Alginates commercially available from Kelco include KELTONE HV, MANUGEL DMB, KELGIN MV, and KELGIN F.

Polyvalent cations will react with and, in some cases, crosslink algin polymers. As the polyvalent ion content in solution is increased, thickening, gelation and finally precipitation will occur. As with other properties of algin solutions, the mannuronic/guluronic acid ratio, the amount of monovalent salts in the solution, solution temperature, degree of polymerization and the polyvalent ion itself will vary the properties of the reacted alginate.

The polyvalent cation most used to change the rheology, viscosity and gel characteristics of algin solutions is calcium. Calcium also may be used as the precipitating ion for the formation of insoluble filaments and films.

The calcium reaction can be made visual by injecting a stream of a 1% sodium alginate (optionally potassium alginate or ammonium alginate) solution into a 10% calcium chloride solution. Almost instantly, calcium alginate will form on the surface of the sodium alginate stream and it will maintain the shape it had when injected into the calcium chloride solution. Initially, the center will be unreacted sodium alginate, but over a period of time the soluble calcium will diffuse into the center and form a complete calcium alginate structure.

The reaction between calcium ions and algin molecules is:

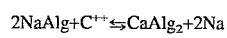

As calcium ions are added to the system, the reaction proceeds to the right until all the alginate is precipitated as calcium alginate.

The physical characteristics of the sodium (or potassium or ammonium)-calcium alginate system vary with the amount of available calcium. Initially, viscosity increases will be evident along with shorter flow characteristics. Further addition of calcium ions results in gel formation and finally precipitation.

The variety of weed sources yields alginates with different mannuronic acid to guluronic acid block structure. Each alginate has its own characteristic calcium reactivity and gelation properties. Alginates are usually referred to as "high M" or "high G," depending on the proportions of mannuronic acid and guluronic acid they contain.

As shown in Table 1, *Laminaria hyperborea* provides a high G alginate. In general terms, high G alginates produce strong, brittle gels that are heat stable, while high M alginates provide weaker, more elastic gels that have less heat stability, but more freeze/thaw stability. Final gel strength, however, can be adjusted by manipulation of the gel chemistry and, in some product situations, high G and high M alginates are interchangeable.

Stoichiometrically, 7.2% calcium is required based on the weight of sodium alginate for complete substitution. Gels are formed with about 30% of this amount and thickened, flowable solutions with less than 15%.

In making gels, the method of addition of a calcium ion to an algin solution has a great deal of influence on the properties of the final gel. Too rapid calcium addition results in spot gelation, discontinuous gel structure, or precipitation.

Combinations of alginate and a slowly dissolving calcium salt can be formulated to control the rate of gel formation. Sequestrants such as tetrasodium pyrophosphate and sodium hexametaphosphate also control the release of calcium ions and alter the texture of the final gel.

To form a cold-water gel, sodium alginate, dicalcium phosphate anhydrous, sodium citrate and adipic acid can be used. When added to water, the sodium citrate dissolves rapidly and sequesters the free calcium in the water, thereby allowing sodium alginate to dissolve. Adipic acid dissolves slowly and reacts with the dicalcium phosphate anhydrous to release calcium ions, which form the gel with sodium alginate. Sequestrants such as tetrasodium pyrophosphate or other polyphosphates may be substituted for citrate. Other calcium sources (calcium carbonate or calcium sulfate) may replace dicalcium phosphate anhydrous. Any slowly dissolving food acid is effective, but adipic acid has the advantage of being non-hygroscopic and of contributing an acid flavor at a pH higher than some other acids used in foods. Control of pH is necessary to prevent premature gelation or precipitation. As the pH drops, ionization of the carboxyl groups is suppressed, with a loss of solubility; gelation occurs initially, followed by precipitation if the pH is dropped far enough. At a pH of about 3.5, an alginate gel is a mixture of a calcium and an acid gel.

The widespread food and industrial use of alginates is usually based on their ability to react with calcium ions to function advantageously as thickeners, film formers, and gelling and structuring agents. As with gellan gum, since calcium ions are capable of producing gels, these ions, if present in sufficiently high amounts, can inhibit alginate hydration. It is therefore accepted practice to use alginates in combination with sequestrants to assist hydration in situations in which the water has to be 'softened' in order for hydration to occur.

In contrast to gellan gum, alginates do not form gels with sodium ions. Thus, when alginate solutions are added to solutions of sodium ions (e.g. salt solution), they do not produce gels by diffusion but, rather, disperse into the aqueous medium upon agitation. Seawater contains a high level of sodium ions and, hence, addition of alginate solutions to seawater would not be expected to result in gel formation.

We have surprisingly found that alginate solutions do, in fact, form diffusion-set gels upon addition to water having high concentrations of sodium ions, such as seawater. Accordingly, alginates can be used as an alternative to gellan gum solutions in the previously mentioned applications. Without being bound by theory, it is believed that the ionic composition of seawater is such that there are sufficient multivalent ions present, notably calcium, to induce gel formation and maintain the alginate in the gelled state despite the presence of sodium and other non-gelling ions which can, depending on the relative proportions of multivalent (gel-forming) and non-gelling (gel-dissolving) ions, cause the gel to disintegrate.

As already indicated, utilization of the invention under practical conditions may frequently require the use of sequestrants to permit hydration of the alginate and gellan gum polymers in cold water. In addition, the strength of the gel required, which depends primarily on polymer concentration, may vary. It is therefore conceivable to envisage situations that call for the use of relatively low levels of alginate combined with relatively high levels of sequestrant. In these cases, the sequestrant, during the initiation of ion diffusion into the solution, will preferentially bind the gel-forming divalent ions, bringing about the possibility of dispersion of the alginate into the surrounding aqueous medium before gelation can occur. With gellan gum, irrespective of the relative gum and sequestrant concentrations, dispersion of the polymer prior to gelation cannot happen because gelation and entrapment of the polymer will occur instantaneously through interaction with sodium and other monovalent ions, which are not bound by the sequestrant.

Consequently, a particularly preferred embodiment of the invention is the use of solutions, comprising both alginate and gellan gum. Such a combination not only eliminates wastage of alginate by diffusion but also provides alternative gel textures and, in some cases, reduced cost.

All alginate gels are formed by chemical reaction. They are generally not thermally reversible and consist of highly hydrated alginate polymers. By proper selection of the gelling agent, gel structure and rigidity can be controlled. Soft gels tend to flow and assume the shape of their container. Water lost to the atmosphere, causing shrinkage, occurs very slowly in algin gels.

Alginate gels of the present invention and alginate gels of the invention including gellan gum are suited for a wide range of oil-field and other applications, including profile control (water shut-off) where the gel is used to block-off the flow of unwanted water production or, preferably, to reduce the permeability to the flow of water while not greatly affecting the flow of oil production. Lost circulation gels should control the major amounts of fluids that are lost to the formation during drilling or workover applications.

The use of gel "plugs" has applications in cement spacers used between fluids or in cleaning pipelines where gel "pigs" remove debris in the lines. The gelled structure is also advantageous for reduction of convection when used in insulating packer fluid applications including protecting the permafrost in Alaska.

There are several environmental uses. One is solidifying waste pits that occur during drilling and/or production operations. This can include the solidification of Naturally Occurring Radioactive Material and drill cuttings offshore. The other use is making pit liners that stop or reduce leaching of chemical into the ground beneath the pits, especially into groundwater.

Alginate gels optionally including gellan gum are useful as fluid loss agents (as films), ballast fluids for ships, friction reduction agents to lower pressure drop or increase the flow rate, hydromulch for leases (especially slopes), sand stabilization aids (water wells, construction pilings, etc.), foam stabilizers with xanthan, and as a moisture barrier for cement.

EXAMPLE 1

Alginates in reconstituted seawater

A solution of 1% KELTONE HV, premium grade sodium alginate, was prepared by carefully dispersing 3 g of the powder in 300 g of deionized water using vigorous agitation. An approximately 50 g aliquot of the solution was poured as a thin stream into simulated seawater which was prepared according to A.S.T.M. method D-1141-52 by dissolving 39.26 g of sea-salt ("sea-salt" is commercially available from Lake Products Company, Inc. (Maryland Heights, Mo.)) in 1 l of deionized water. The instantaneous formation of 'gelled worms' was observed. This example shows the ability of alginate solutions, prepared without heat, to form gels by ion diffusion, when added to seawater.

EXAMPLE 2

Gellan gum in reconstituted seawater

A 0.5% solution of KELCOGEL gellan gum was prepared by dissolving a mixture of 1.5 g gellan gum and 0.45% sodium citrate in 300 g of deionized water using vigorous agitation. An approximately 50 g aliquot of the solution was poured as a thin stream into simulated seawater which was prepared by dissolving 39.26 g of sea-salt in 1 l of deionized water. The instantaneous formation of 'gelled worms' was observed.

This example shows the ability of gellan gum solutions, prepared without heat, to form gels by ion diffusion, when added to seawater.

EXAMPLE 3

Alginates in reconstituted seawater

As described in Example 1, 1% solutions of the following alginates were prepared—KELTONE HV, MANUGEL DMB (a premium gelling alginate with a high content of guluronic acid monomer), KELGIN MV, and KELGIN F (medium viscosity, refined sodium alginates). Each solution was poured into reconstituted seawater, as described in Example 1. Gels formed in all cases. The MANUGEL DMB gel appeared to be slightly stronger than the other gels.

EXAMPLE 4

Alginates in real seawater

As described in Example 1, 1% solutions of the following alginates were prepared—KELTONE HV, MANUGEL DMB (a premium gelling alginate with a high content of guluronic acid monomer), KELGIN MV, and KELGIN F (medium viscosity, refined sodium alginates). Each solution was poured, according to the procedure of Example 1, into real seawater sampled from the sea at Ocean Beach, Calif. Gels formed in all cases. The MANUGEL DMB gel appeared to be slightly stronger than the other gels. This example and Example 3 show that gel formation is not restricted to specific alginates.

EXAMPLE 5

Alginates in 1% calcium chloride solution

As described in Example 1, 1% solutions of the following alginates were prepared—KELTONE HV, MANUGEL DMB (a premium gelling alginate with a high content of guluronic acid monomer), KELGIN MV, and KELGIN F (medium viscosity, refined sodium alginates). Each solution was poured, according to the procedure of Example 1, into 1% calcium chloride solution. Gels stronger than those obtained in seawater formed in all cases. The MANUGEL DMB gel s appeared to be slightly stronger than the other gels.

EXAMPLE 6

Alginates in 1% sodium chloride solution

As described in Example 1, 1% solutions of the following alginates were prepared—KELTONE HV, MANUGEL DMB (a premium gelling alginate with a high content of guluronic acid monomer), KELGIN MV, and KELGIN F (medium viscosity, refined sodium alginates). Each solution was poured, according to the procedure of Example 1, into 1% sodium chloride solution. Gels did not form, and the solutions dispersed into the aqueous environment under mild agitation.

This example shows that gel formation does not take place in sodium salt solution.

EXAMPLE 7

Alginates in reconstituted seawater

San Diego tap water has a hardness value typically around 180 ppm, expressed as calcium carbonate. Complete hydration of alginates and gellan gum in cold San Diego tap water, as a result, requires the use of the sequestrant.

A 1% solution of KELGIN MV was prepared in San Diego tap water by dispersion of the product using vigorous agitation and 0.10% added sodium hexametaphosphate as sequestrant. The solution formed a gel when added to reconstituted seawater. The gel was isolated on a sieve after approximately 16 hours and found to be soft and mushy.

The supernatant liquid from which the gel was removed was analyzed using the phenol/sulfuric acid test for soluble carbohydrate. No significant amount of carbohydrate was detected, indicating that the polymer was retained essentially completely within the gel network and did not leach out into the surrounding liquid.

The experiment shows that gelation can still occur when sequestrant is required to effect hydration, and diffusion setting in the manner previously described is extremely efficient (essentially all polymer being utilized).

EXAMPLE 8

Gellan gum in reconstituted seawater

A 0.5% solution of KELCOGEL gellan gum was prepared in San Diego tap water by dispersion of the product using vigorous agitation and 0.12% added sodium hexametaphosphate as sequestrant. The solution formed a gel when added to reconstituted seawater. The gel was firm and brittle.

The supernatant liquid from which the gel was removed was analyzed using the phenol/sulfuric acid test for soluble carbohydrate. No significant amount of carbohydrate was detected, indicating that the polymer was retained essentially completely within the gel network and did not leach out into the surrounding liquid.

The experiment shows that gelation can still occur when sequestrant is required to effect hydration, and diffusion setting in the manner previously described is extremely efficient (essentially all polymer being utilized).

EXAMPLE 9

Alginates in combination with gellan gum in reconstituted seawater

A solution containing 0.3% KELCOGEL, 1.0% KELGIN MV, and 0.12% sodium hexametaphosphate was prepared in San Diego tap water by dispersion of the product using vigorous agitation. The solution formed a gel when added to reconstituted seawater. The gel was fairly strong and coherent and different in texture from the other two gels.

The supernatant liquid from which the gel was removed was analyzed using the phenol/sulfuric acid test for soluble carbohydrate. No significant amount of carbohydrate was detected, indicating that the polymer combination was retained essentially completely within the gel network and did not leach out into the surrounding liquid.

The experiment shows that gelation can still occur when sequestrant is required to effect hydration, combinations of alginate and gellan gum provide strong gels, and diffusion setting in the manner previously described is extremely efficient (essentially all polymer being utilized).

EXAMPLE 10

Seawater analyses

A sample of the reconstituted seawater used in Examples 1, 2, 3, 7, 8, and 9 and a sample of the real seawater used in Example 4 were analyzed for ionic composition by atomic absorption. The results were as follows:

| | reconstituted | | real |
|---|---|---|---|
| Ca: | 273.7 ppm, | Ca: | 298.9 ppm |
| K: | 452.9 ppm | K: | 439.8 ppm |
| Mg: | 828.6 ppm | Mg: | 856.4 ppm |
| Na: | 9605.1 ppm | Na: | 9523.2 ppm |

A solution containing calcium, potassium, magnesium, and sodium in the approximate proportions occurring in the reconstituted seawater (and hence also in real seawater since its composition is similar to that of the reconstituted seawater) was prepared by adding the appropriate amounts of the chlorides of each of these cations to deionized water. One percent solutions of KELTONE HV and KELGIN MV sodium alginates, prepared in deionized water as already described, were added as a thin stream to this salt solution and, again, 'gelled worms' were formed.

This example shows that the ionic composition of seawater is, fortuitously, such that, despite the relatively high content of non-gelling ions, notably sodium, there is sufficient calcium present to being about alginate gelation.

What is claimed is:

1. A gel comprising water, sodium ions, calcium ions, a sequestrant, gellan gum and alginate, wherein the ratio of sodium ions to calcium ions is between about 15:1 to about 45:1, the amount of alginate is between about 0.3 and 4%, the amount of gellan gum is between about 0.05 and 4%, and the amount of sequestrant is between about 0.01 and 1.5%.

2. A gel of claim 1, wherein the amount of alginate comprises between about 0.7 and 2%, the amount of gellan gum is between about 0.2 and 1%, and the amount of sequestrant is between about 0.05% and 0.6%.

3. A gel of claim 1, wherein the alginate comprises mannuronic acid and guluronic acid in a weight ratio of between about 2:1 and 0.35:1.

4. A gel comprising water, sodium ions, calcium ions, a sequestrant, and gellan gum, wherein the ratio of sodium ions to calcium ions is between about 15:1 to about 45:1, the amount of gellan gum is between about 0.05 and 4%, and the amount of sequestrant is between about 0.01 and 1.5%.

* * * * *